(12) United States Patent
Rao (10) Patent No.: US 7,130,957 B2
(45) Date of Patent: Oct. 31, 2006

(54) STORAGE SYSTEM STRUCTURE FOR STORING RELATIONAL CACHE METADATA

(75) Inventor: Raghavendra J. Rao, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 320 days.

(21) Appl. No.: 10/775,432

(22) Filed: Feb. 10, 2004

(65) Prior Publication Data

US 2005/0177672 A1 Aug. 11, 2005

(51) Int. Cl.
*G06F 12/00* (2006.01)

(52) U.S. Cl. .................. 711/3; 711/122; 711/118
(58) Field of Classification Search ............. 711/3, 711/6, 203, 117, 118, 122, 206; 707/202
See application file for complete search history.

(56) References Cited

U.S. PATENT DOCUMENTS

| | | | | |
|---|---|---|---|---|
| 5,606,688 A * | 2/1997 | McNutt et al. | ............ | 711/170 |
| 5,764,945 A | 6/1998 | Ballard et al. | | |
| 6,301,605 B1 | 10/2001 | Napolitano et al. | | |
| 6,732,124 B1 * | 5/2004 | Koseki et al. | ............ | 707/202 |
| 6,763,432 B1 * | 7/2004 | Charney et al. | ............ | 711/144 |
| 6,807,606 B1 * | 10/2004 | Copeland et al. | ............ | 711/120 |
| 6,832,290 B1 | 12/2004 | Todd | | |
| 6,928,521 B1 * | 8/2005 | Burton et al. | ............ | 711/144 |
| 2003/0005219 A1 * | 1/2003 | Royer et al. | ............ | 711/113 |
| 2003/0046493 A1 * | 3/2003 | Coulson | ............ | 711/118 |
| 2004/0111443 A1 * | 6/2004 | Wong et al. | ............ | 707/202 |

OTHER PUBLICATIONS

Notification of Transmittal of the International Search Report and the Written Opinion of the International Searching Authority, or the Declaration, International application No. PCT/US2005/004319, Jun. 6, 2005.
PCT Written Opinion of the International Searching Authority, International application No. PCT/US2005/004319, Jun. 6, 2005.

\* cited by examiner

*Primary Examiner*—Reginald Bragdon
*Assistant Examiner*—Thanh D. Vo
(74) *Attorney, Agent, or Firm*—Meyertons Hood Kivlin Kowert & Goetzel, P.C.; B. Nl Kivlin; Stephen J. Curran (57) ABSTRACT

A storage system includes a cache and a collection of metadata, organized by their associations with regard to the data they represent. In one embodiment, the cache stores data blocks in a first plurality of locations. A first metadata storage stores metadata including block addresses of data blocks within the cache. A second metadata storage includes a second plurality of locations, each for storing metadata including a block address identifying a corresponding data block within the cache. The metadata stored within the second metadata storage also includes a first pointer to the corresponding data block. In addition, at least one of the second locations may store a second pointer to another of the second locations that stores metadata corresponding to a related data block. The cache and the first metadata storage are non-volatile storages; however, the second metadata storage may be a volatile storage.

25 Claims, 6 Drawing Sheets

STORAGE SYSTEM STRUCTURE FOR STORING RELATIONAL CACHE METADATA

BACKGROUND OF THE INVENTION

1. Field of the Invention

This invention relates to storage system caches and, more particularly, to metadata design within the storage system cache.

2. Description of the Related Art

Many storage systems employ non-volatile caching as a means of improving input/output (I/O) performance between the storage subsystem and the host(s). In addition, the non-volatile cache may be used to improve internal storage system operations such as error logging, recovery, and reconstruction for example.

Many such storage caches include data storage as well as metadata storage. Metadata typically includes information that describes the data. For example, metadata may include validity information and a pointer to the location of the data. Thus, at any point in time, the integrity of the metadata is critical. For systems having a high reliability, availability and serviceability (RAS) rating, in addition to the data, the metadata is generally stored in a storage medium that is non-volatile and which can survive from such catastrophic failures as system crashes and power failures.

Generally speaking, the storage cache may be implemented to be addressable in either the CPU memory space or in the I/O space. There are design implications for both approaches. For example, if the storage cache is placed in the CPU memory space, as the size of the storage cache increases, it may become impractical to address the entire cache in the CPU memory space. In addition, there may be limited memory bandwidth. Further, to place the storage cache in the CPU memory space may require a large part of the system memory to survive a power loss, thereby requiring a large battery backup. If the storage cache is placed in the I/O space, data requests may be markedly slow due to such conditions as slower I/O buses compared to the CPU memory bus and constrained accessibility of the I/O buses, for example. This may be particularly true for read operations into the I/O space. However, one positive attribute of having the storage cache placed in the I/O space is that the requirement for battery backup may be reduced.

In high availability systems, the system may employ cache mirroring. In such systems, a storage cache may be mirrored onto another cache system in an independent failure domain. Such systems typically employ a fixed structure, self-describing cache in the I/O space. The self-describing cache uses a portion of the cache space to store enough information to identify the dirty and the valid blocks in the storage cache. However, when the primary cache fails, there is a delay associated with reconstructing the metadata from the self-describing cache. This reconstruction delay impacts the availability and performance of the system under failure conditions. Therefore a key aspect of the storage cache design is the structure and management of the metadata.

In addition, in various systems, the cache may be used to store more than one copy of the user data that is stored in the underlying storage volume at a given time. For example, data having a related association with the data stored in the underlying storage volume may also be stored in the cache. One example of such related data is generational data. Another example of related data is the Exclusive OR or "Parity" data of current data and newly written data. One technique used for storing related data in the cache involves dis-aggregating or splitting the cache and using the different portions of the cache to store different types of data and their associated metadata. However, as more powerful metadata structures are employed, the metadata size may increase, thereby increasing the metadata overhead. In addition, splitting the cache may increase the cache management burden by having to manage more than one type of cache with respect to allocation, population and de-staging, for example.

SUMMARY

Various embodiments of a storage system including hierarchical cache metadata storage for storing relational cache data are disclosed. In one embodiment, the storage system includes a cache, a first metadata storage, and a second metadata storage. The cache may be configured to store a plurality of data blocks in a first plurality of locations. The first metadata storage may include a plurality of entries that stores metadata including block addresses of data blocks within the cache. The second metadata storage may include a second plurality of locations each for storing metadata including a block address identifying a corresponding data block within the cache. The metadata stored within the second metadata storage may also include a first pointer to the corresponding data block within the cache. In addition, at least one of the second plurality of locations may further store a second pointer to another of the second plurality of locations that stores metadata corresponding to a related data block. The cache is a non-volatile storage such as non-volatile random access memory (RAM) or battery backed-up dynamic RAM, for example. Similarly, the first metadata storage is also implemented as a non-volatile storage. However, unlike the cache and the first metadata storage, in one implementation, the second metadata storage may be a volatile storage.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Figure 1:
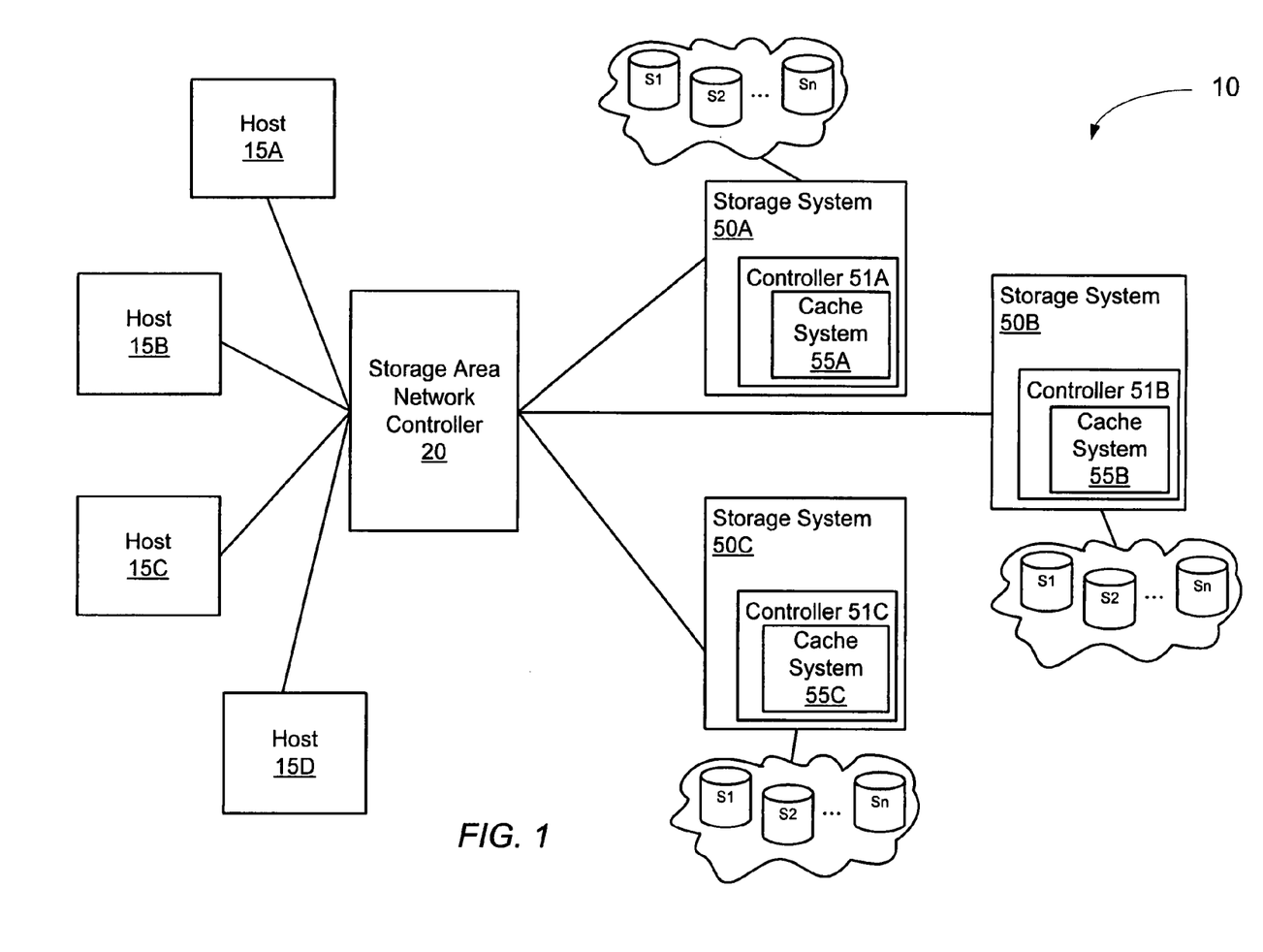
FIG. 1 is a block diagram of one embodiment of a computer system employing multiple storage systems.

Turning now to FIG. 1, a block diagram of one embodiment of a computer system employing a plurality of storage systems is shown. Computer system 10 includes a plurality of hosts, 15A through 15D, that are coupled to a plurality of storage systems, designated 50A through 50C, via a storage area network (SAN) controller 20. The interconnections between hosts 15 and SAN controller 20 and between SAN controller 20 and storage systems 50 may be implemented using any type of high bandwidth protocol such as Fibre Channel or Gigabit Ethernet, for example. It is noted that components having a reference number followed by a letter may be referred to by the reference number alone when appropriate. It is further noted that computer system 10 is an exemplary system illustrative of only one of many different storage system topologies. For example, in other embodiments, computer system 10 may include any number of hosts 15 coupled to any number of storage systems 50. In addition, in some embodiments, other numbers of SAN controllers (e.g., SAN controller 20) may be used to create complex storage system topologies.

In the illustrated embodiment, hosts 15A–15D may be illustrative of any type of processing node. For example, hosts 15A–15D may include computing servers that may be further connected to workstations and personal computers through a network such as local area network (LAN) or the internet. In any of the configurations described above, hosts 15A–15D may include one or more processors, local memory and I/O capabilities and so on. As such, each of hosts 15A–15D maybe configured to read data from and write data to storage systems 50.

SAN controller 20 is configured to control and route transactions between hosts 15 and storage systems 50. Accordingly, SAN controller 20 may include a switch or hub. In addition, in one embodiment, SAN controller 20 may include processing capabilities that provide SAN storage management. For example, in such an embodiment, SAN controller 20 may be configured to provide disk virtualization, performance monitoring, and management tasks and depending on the implementation, SAN controller 20 may also provide partitioning of storage systems 50 into one or more domains.

Storage systems 50A–50C may each include one or more storage devices. In the illustrated embodiment, the storage devices are designated S1 through Sn, where n may be any number. In one embodiment, storage devices S1–Sn may be hard disks that belong to a storage array. The storage devices in each storage system 50 may be controlled by a respective storage controller designated 51–51C. As described in greater detail below, each of the storage controllers includes at least one cache system 55. Depending on the reliability, availability and serviceability (RAS) level of the system, there may be redundant storage controllers (not shown). In one embodiment, the storage array may be configured as a redundant array of inexpensive disks (RAID). In other embodiments, storage devices S1-Sn may be tape drives. In still further embodiments, storage devices S1–Sn may be any type of non-volatile permanent storage device. It is noted that depending on the implementation, a storage device or a number of storage devices may be referred to as an underlying storage volume.

As will be described in greater detail below in conjunction with the descriptions of FIG. 2 through FIG. 6 each of cache systems 55 may include a cache memory (not shown in FIG. 1) for storing cached data and a hierarchical arrangement of metadata storage for storing metadata that describes the data in the cache storage. The hierarchical arrangement may provide enhanced performance through efficient metadata operations while allowing a robust recovery model to be built using techniques such as cache mirroring, for example.

Figure 2:
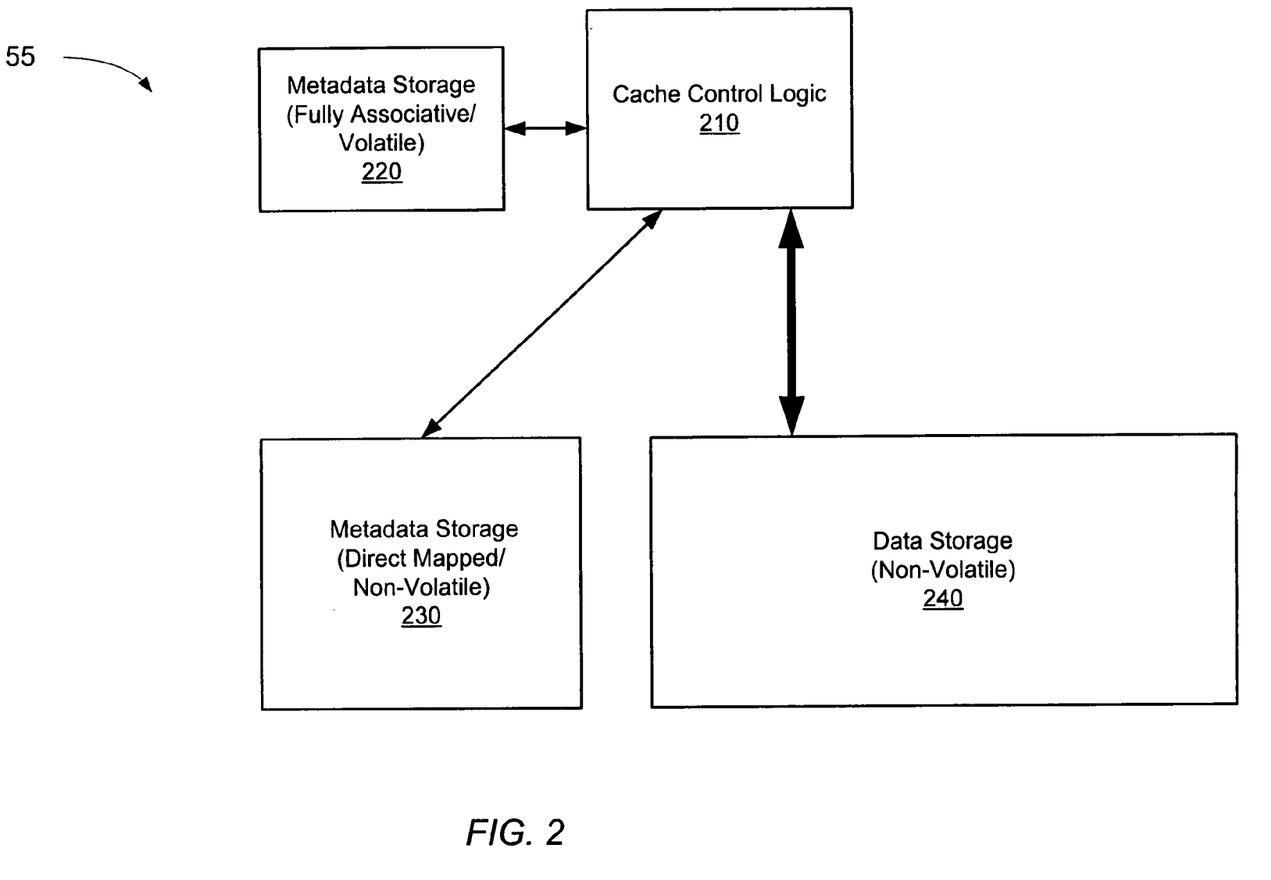
FIG. 2 is a block diagram of one embodiment of a storage cache system of FIG. 1.

Referring to FIG. 2, a block diagram of one embodiment of storage cache system 55 is shown. Cache system 55 includes cache control logic 210 that is coupled to a fully associative metadata storage 220, a direct mapped metadata storage 230, and a data storage 240. It is noted that the components illustrated in cache system 55 may be representative of the components included in each of cache systems 55A–55C of FIG. 1.

In illustrated embodiment, data storage 240 is a cache memory implemented using any type of non-volatile storage. Data storage 240 is configured to store data and is capable of surviving a system power loss. For example, in one implementation, data storage 240 may be a storage medium such as non-volatile random access memory (NVRAM). In another implementation, data storage 240 may include memory devices having a battery backup mechanism. Although it is contemplated that in other embodiments, other types of non-volatile storage may be used. In one implementation, data storage 240 may include a plurality of locations each capable of storing data in the form of data blocks. The size of a data block is implementation dependent; although typical data block sizes may be 8K, 16K, and 32K bytes. To access data storage 240, each location may have a corresponding index. In one implementation, data storage 240 may be fully associative with respect to the underlying storage devices (e.g., S1–Sn). For example, any location within data storage 240 may store data corresponding to any block address of the underlying storage devices.

As described above, a storage cache system such as cache system 55 may be used by a storage system to improve storage system performance. However, to fully realize the benefits of using a cache system, careful consideration may be given to the definition and organization of the metadata. Accordingly, in the illustrated embodiment, the metadata of cache system 55 is arranged in a two-level hierarchical structure. The two-level hierarchy includes first-level metadata stored within metadata storage 220 and second-level metadata stored within metadata storage 230. More particularly, each data block within data storage 240 is associated with two independent pieces of metadata. Specifically, a given data block is associated with metadata within volatile metadata storage 220 and also with metadata within non-volatile metadata storage 230.

Metadata storage 220 is a storage used for storing metadata that describes the data blocks stored within data storage 240. Metadata storage 220 is arranged as a fully associative cache. As such, any data block within data storage 240 may be represented by metadata stored in any location within metadata storage 220. In the illustrated embodiment, metadata storage 220 is implemented as a volatile storage medium. For example, metadata storage 220 may be implemented using any type of volatile memory such as any of the memory devices in the DRAM family. As will be described in greater detail below in conjunction with the description of FIG. 3, the metadata stored within metadata storage 220 is arranged in a structure including a collection of cache descriptors that describe the data that is stored within data storage 240. Furthermore, metadata storage 220 may be located in CPU memory space. As such, access to metadata storage 220 may be faster than accesses to metadata storage 230 which, as described below, may be located in the I/O space.

Metadata storage 230 is also a storage used for storing metadata that describes the data blocks stored within data storage 240. Metadata storage 230 is arranged as a direct mapped cache including a cache descriptor table. More particularly, each location within metadata storage 230 has a one to one correspondence with a respective location within data storage 240. In other words, a given location within metadata storage 230 corresponds to only one particular location within data storage 240. In contrast to metadata storage 220, metadata storage 230 is implemented as a non-volatile storage medium. Similar to data storage 240, metadata storage 230 is also capable of surviving a system power loss. As described in greater detail below in conjunction with the description of FIG. 4, metadata storage 230 is arranged as a table structure including a plurality of entries. Each entry is a cache descriptor that describes the corresponding data that is stored within data storage 240. It is noted that in one implementation, since metadata storage 230 is implemented as a non-volatile storage medium and may generally be used for reconstruction of metadata and as a backup, it may be located within the I/O space.

Cache control logic 210 is configured to control accesses to cache system 55. For example, in one implementation, cache control logic 210 controls writing of data into data storage 240 by maintaining a freelist (not shown) of available locations with data storage 240, allocating metadata storage locations within metadata storage 220, providing notification when a write operation is complete, and reading data from data storage 240. In addition, as described in greater detail below in conjunction with the description of FIG. 5, cache control logic 210 may also be configured to control cache mirroring for systems employing redundant cache systems. It is noted that cache control logic 210 may operate in conjunction with the logic within a storage controller 51. In one implementation, cache control logic 210 may be an integral part of the storage controller.

Figure 3:
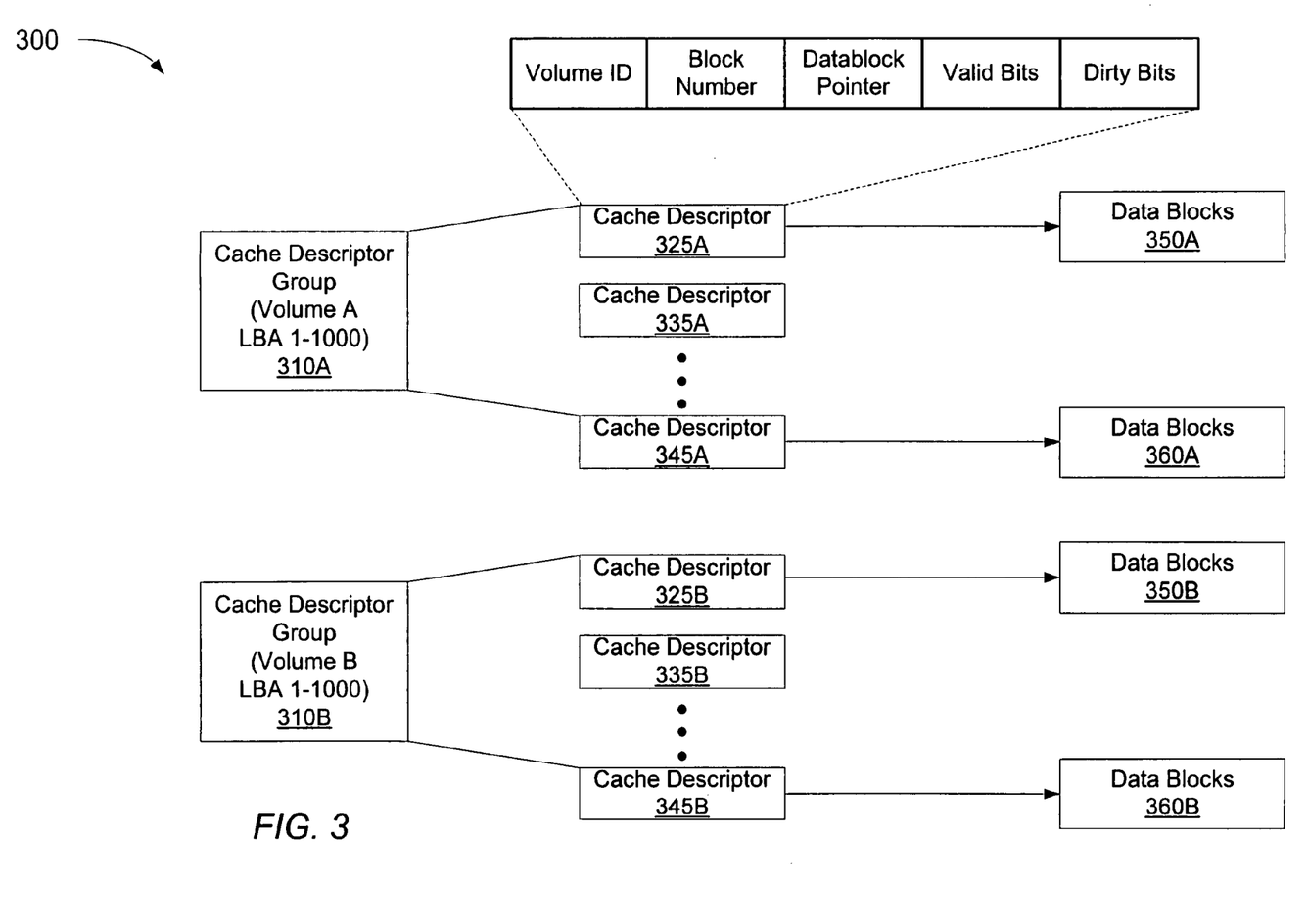
FIG. 3 is a diagram depicting one embodiment of the fully associative metadata structure of the storage cache system of FIG. 2.

Turning to FIG. 3, a diagram depicting one embodiment of a metadata structure within metadata storage 220 of FIG. 2 is shown. As described above, metadata storage 220 includes a plurality of locations each including a cache descriptor. Metadata structure 300 illustrates the arrangement of the cache descriptors. The cache descriptors are arranged into two cache descriptor groups: cache descriptor group A and cache descriptor group B. The cache descriptors in cache descriptor group A are designated 325A, 335A, and 345A, while the cache descriptors in cache descriptor group B are designated 325B, 335B, and 345B. It is noted that only two cache descriptor groups are shown for simplicity and it is contemplated that any number of cache descriptor groups, including no cache descriptor groups, may be used as desired.

As described above, metadata storage 220 is arranged as a fully associative cache. In a fully associative cache, when the size of the cache is a large the lookup times tend to increase due to the increased depth of cache buckets or the depth of the tree depending on the data structure in use. To address this, the cache descriptor groups are used. A cache descriptor group consists of a number of cache descriptors that point to a number of data blocks that hold user data corresponding to a range of contiguous logical block addresses associated with a given storage volume. A cache descriptor group may either be fully populated or partially populated with corresponding data blocks containing data. In the illustrated embodiment, cache descriptor group A includes cache descriptors that correspond to data blocks having logical block addresses one through 1000 in storage volume A. Likewise, cache descriptor group B includes cache descriptors that correspond to data blocks having logical block addresses one through 1000 in storage volume B. It is noted that although each cache descriptor group is associated with a contiguous number of logical block addresses, it is contemplated that in other embodiments cache descriptor groups may be associated with other attributes. It is further noted that each cache descriptor group may be tied together via a structure such as a tree or hash list, for example.

Since metadata storage 220 is fully associative, each cache descriptor points to a corresponding data block stored anywhere within data storage 240. For example, cache descriptor group A includes cache descriptor 325A, which points to data block 350A. Likewise, cache descriptor 345A points to data block 360A. Each of data blocks 350A and 360A may be located anywhere in data storage 240. In addition to a pointer to a corresponding data block, each cache descriptor includes information that describes the corresponding data block in data storage 240. In the illustrated embodiment, the contents of one cache descriptor (e.g., cache descriptor 325A) are shown as an exemplary illustration of the contents of any cache descriptor within metadata storage 220.

Cache descriptor 325A is shown having five fields, each including a number of bits. It is noted that the number of bits within each field is implementation dependent. The first field from the left is labeled "Volume ID," which identifies a storage volume on which the user data is stored. The second field is labeled "Block Number," which corresponds to the logical block address of the corresponding data block on the volume identified in the "Volume ID" field. Thus, the "Volume ID" and "Block Number" fields may be used to identify whether a given data block is stored within data storage 240. The third field from the left is labeled "Datablock Pointer." The data block pointer is used by cache control logic 210 to index into data storage 240 to access the corresponding data block. The fourth field from the left is labeled "Valid Bits." The valid bits are indicative of whether or not the data is valid. For example, once data is written into data storage 240 the "Valid Bits" may indicate that the data stored within the corresponding data block of data storage 240 is valid. The fifth field from the left is labeled "Dirty Bits." The Dirty Bits are indicative of whether the user data stored within the data block of data storage 240 needs to be written back to the storage volume. It is noted that in other embodiments, each entry may include other numbers of fields. It is further noted that other fields having other identifiers may be used such as whether an operation is currently in progress, for example.

It is noted that in one embodiment, metadata structure 300 may also include a valid list of cache descriptors organized based on properties such as least recently used (LRU) data blocks, for example. In addition, metadata structure 300 may include a list of dirty descriptor groups organized on similar properties such as the least recently used or least frequently used or a combination of both. It is further noted that in alternative embodiments, metadata structure 300 may include a separate field (not shown) identifying the LRU status of a given entry relative to each other entry for use by cache control logic 210 when evicting entries and corresponding data blocks.

Figure 4:
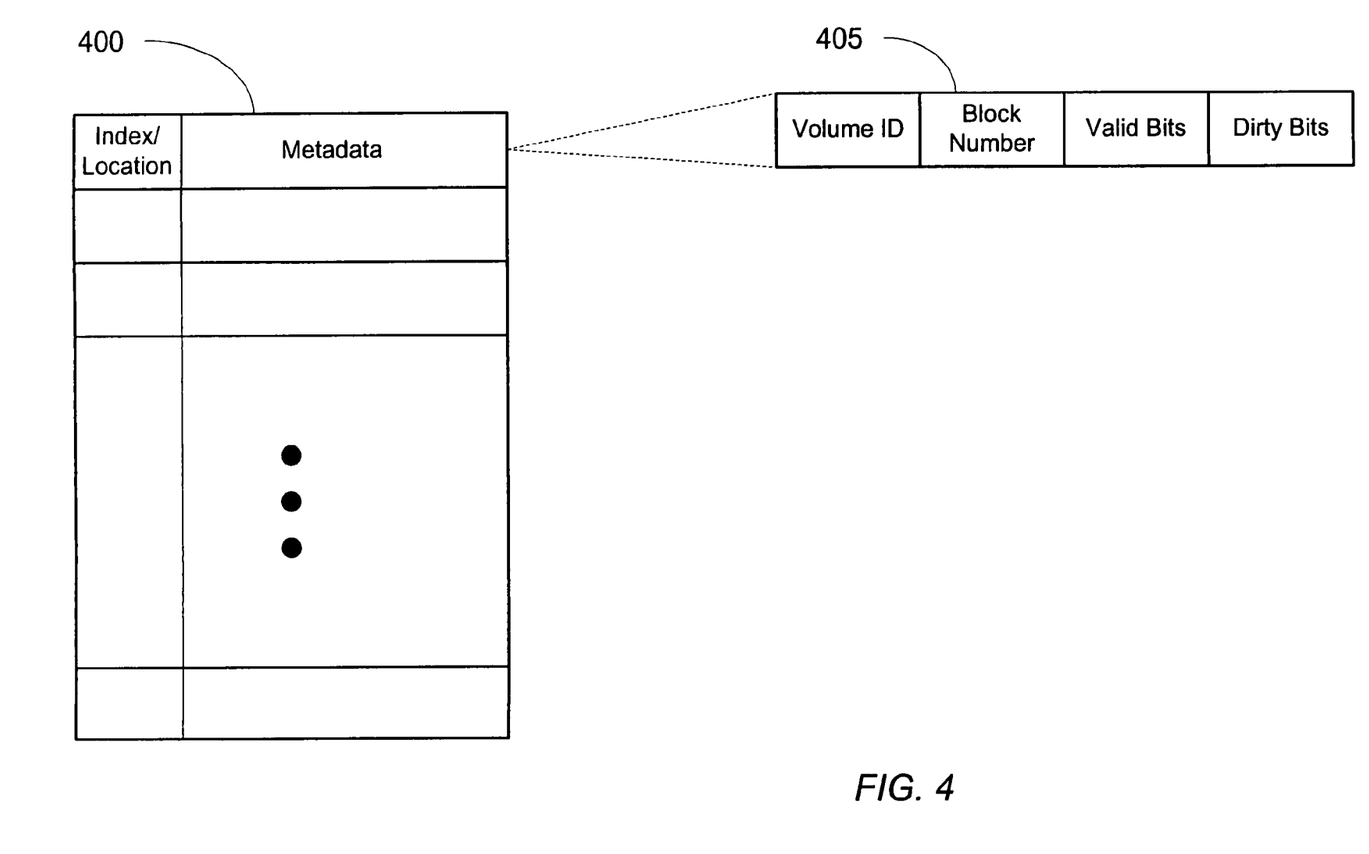
FIG. 4 is a diagram depicting one embodiment of the direct mapped metadata structure of the storage cache system of FIG. 2.

Referring to FIG. 4, a diagram depicting one embodiment of a metadata structure within metadata storage 230 of FIG. 2 is shown. Metadata structure 400 is shown as a cache descriptor table including a plurality of entries representing all the data blocks stored within data storage 240. Each entry maps to exactly one location and thus one data block within data storage 240. Therefore, metadata structure 400 is referred to as a direct mapped metadata structure. As described below, a volume and block address of an entry may be used to determine whether a given data block is stored within data storage 240. The entry containing the metadata is used to index into data storage 240. During metadata updates, the data block pointer stored within metadata storage 220 may be used to index into metadata storage 230. In the illustrated embodiment, the contents of one cache descriptor entry (e.g., cache descriptor 405) are shown as an exemplary illustration of the contents of any cache descriptor entry within metadata storage 230.

Cache descriptor table entry 405 is an exemplary entry within metadata structure 400. In the illustrated embodiment, entry 405 includes four fields. The first field from the left is labeled "Volume ID," which identifies a storage volume on which the user data is stored. The second field is labeled "Block Number," which corresponds to the logical block address of the corresponding data block on the volume identified in the "Volume ID" field. Thus, the "Volume ID" and "Block Number" fields may be used to identify whether a given data block is stored within data storage 240. The entry containing the metadata having the specified volume ID and block address is used to index into data storage 240. The third field from the left is labeled "Valid Bits." The valid bits are indicative of whether or not the data is valid. For example, once data is written into data storage 240 the "Valid Bits" may indicate that the data stored within the corresponding data block of data storage 240 is valid. The fourth field from the left is labeled "Dirty Bits." The Dirty Bits are indicative of whether the user data stored within the data block of data storage 240 needs to be written back to the storage volume. It is noted that in other embodiments, each entry may include other numbers of fields. It is further noted that other fields having other identifiers may be used.

Since metadata structure 400 is stored within data storage 230, which is a non-volatile storage, in the event of a system power failure, the storage system may use the metadata within metadata storage 230 to reconstruct the cache descriptors in metadata storage 220 and initiate any de-staging operations required upon power-up. In addition, as will be described further below, in one embodiment, the cache descriptor table may be updated when a data block is allocated and after data is written to the newly allocated data block.

Referring collectively to FIG. 1 through FIG. 4, a typical lookup and update sequence is described. When a write request is received by cache control logic 210, cache control logic 210 is configured to perform a lookup operation within the first-level metadata (e.g., metadata storage to 220). Since metadata storage 220 is located in CPU memory space, accesses are typically fast. If no data block is already allocated before the write request (i.e., a cache miss), cache control logic 210 allocates a data block within data storage 240 from a free list (not shown) maintained by cache control logic 210. In addition, cache control logic 210 allocates a cache descriptor within metadata storage 220 and points the newly allocated cache descriptor to the newly allocated data block by writing the location of the data block into the pointer field of the cache descriptor. Further, cache control logic 210 initializes the state of the cache descriptor (e.g., data invalid, data dirty). In one implementation, cache control logic 210 may provide the pointer to storage controller 51, so that the storage controller may directly write the data into data storage 240. In another implementation, cache control logic 210 uses the pointer to directly write the data into data storage 240. Once the data transfer is complete, cache control logic 210 updates the cache descriptor within metadata storage 220 marking the completion of the I/O operation and the validity of the data (e.g., data valid). Cache control logic 210 then updates the metadata (e.g. cache descriptor table entry) stored within metadata storage 230. Since the cache descriptor table is direct mapped, cache control logic 210 simply indexes into the table based on the datablock pointer and updates the entry to reflect the validity of the corresponding data. Once the metadata has been updated within metadata storage 230, in one implementation cache control logic 210 may provide a notification that notify the write operation is complete. It is noted that if the data storage 240 is full, a data block may be evicted and a corresponding cache descriptor invalidated.

As a read request is received, cache control logic 210 performs a lookup operation within metadata storage 220 based upon the block address. If there is a hit, a pointer to the data block is returned from the cache descriptor. Cache control logic 210 then uses the pointer to index into data storage 240 and returns the requested data. However, if there is a miss, cache control logic 210 first allocates a data block within data storage 240. It is noted that if the data storage 240 is full, a data block may be evicted and a corresponding cache descriptor invalidated. Cache control logic 210 allocates a cache descriptor for the newly allocated data block and updates the state information in the newly allocated cache descriptor to indicate a pending operation. Cache control logic 210 then initiates a fetch operation to retrieve the requested data from the underlying storage volume and to store the data into data storage 240. In one implementation, cache control logic 210 may notify storage controller 51 of the miss. In such an implementation, storage controller 51 may perform the fetch operation. When the fetch operation is complete and the data is stored within data storage 240, cache control logic 210 is notified of the fetch completion. In response to the fetch completion notification, cache control logic 210 is configured to return the pointer to the data block where the data is stored to transfer the data to the host. Cache control logic 210 is also notified when the data transfer to the host is complete. In response to the transfer completion notification, cache control logic 210 is configured to update the state information (e.g., valid bits) within the cache descriptor corresponding to the data block. It is noted that in one implementation, during the read operation, metadata storage 230 is not accessed. However, as will be described further below in conjunction with the description of FIG. 5, in systems requiring that read data be mirrored to a secondary cache system, cache control logic 210 may be configured to update a non-volatile data storage similar to data storage 240.

Figure 5:
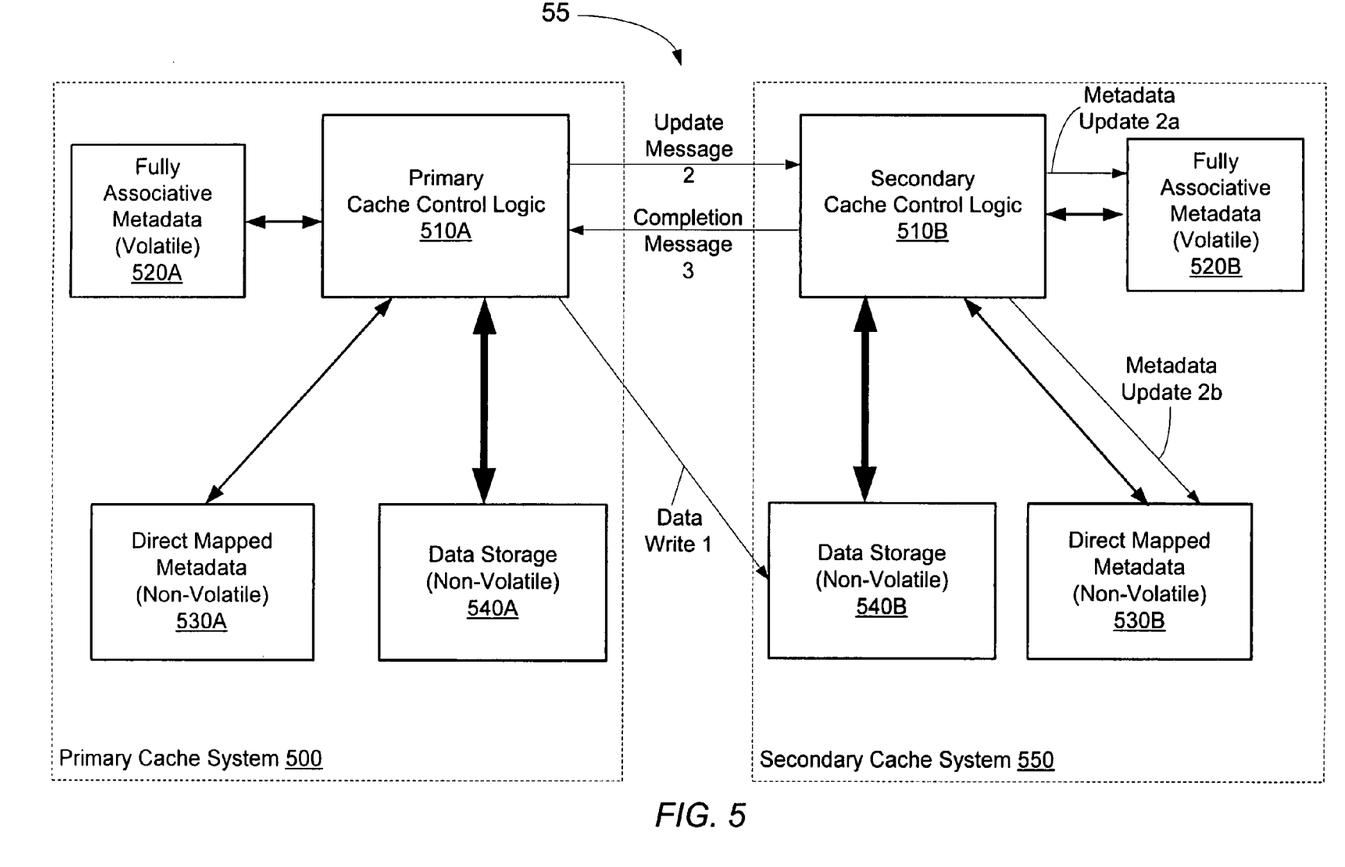
FIG. 5 is a block diagram of one embodiment of a storage cache system employing cache mirroring.

Referring to FIG. 5, a block diagram of one embodiment of cache system 55 employing cache mirroring is shown. Cache system 55 of FIG. 5 includes a primary cache system 500 coupled to a secondary cache system 550. Primary cache system 500 includes primary cache control logic 510A coupled to a data storage 540A, a metadata storage 520A, and a metadata storage 530A. Secondary cache system 550 includes secondary cache control logic 510B coupled to a data storage 540B, a metadata storage 520B, and a metadata storage 530B. It is noted that the selection of which cache system is the primary and which is the secondary is arbitrary as long as one of the two is designated as a primary.

To illustrate the cache mirroring functionality of cache system 55, an exemplary write operation is described. During a cacheable access (e.g., a data write) to storage systems 50A–50C, data is cached in both primary cache system 500 and secondary cache system 550. When a write request is received by primary cache system 500, primary cache control logic 510A allocates and writes the data blocks to data storage 540A and updates metadata storage 520A and 530A as described above in conjunction with the write operation description of FIG. 1-FIG. 4. When the write operation is complete within primary cache system 500, primary cache control logic 510A initiates a remote data write operation 1 to data storage 540B of secondary cache system 550. Primary cache control logic 510A is configured to send an update message 2 to secondary cache control logic 510B indicating that the metadata corresponding to the newly written data should be updated. In response to receiving update message 2, secondary cache control logic 510B is configured to update both the metadata stored within metadata storage 520B (e.g., arrow designated number 2a) and the metadata stored within metadata storage 530B (e.g., arrow designated number 2b). In one implementation, secondary cache control logic 510B may update metadata storage 520B followed by metadata storage 530B. It is noted that in other implementations, secondary cache control logic 510B may update metadata storage 530B followed by metadata storage 520B. Once the data is committed and mirroring operation is complete (i.e. metadata storage 530B has been updated), secondary cache control logic 510B sends a completion message 3 to primary cache control logic 510A. Thus, all the committed metadata is up-to-date and ready to use within secondary cache system 550. In response to the completion message 3, primary cache control logic 510A may provide a notification of the completion to the storage controller (not shown in FIG. 5) in one implementation, or to the host in another implementation.

In one embodiment, read requests resulting in a cache miss may also be mirrored to secondary cache system 555. For example, as described above, if a read request results in a miss, primary cache control logic 510A allocates data blocks within data storage 540A, allocates a cache descriptor within metadata storage 520A and initiates a fetch operation to retrieve the requested data from the underlying storage volume. In addition, once the data has been stored within data storage 540A, primary cache control logic 510A is configured to perform a remote write operation to data storage 540B within secondary cache system 550. Further, primary cache control logic 510A may also be configured to send an update message to secondary cache control logic 510B indicating that metadata storage 520B needs to be updated as described above. In one implementation, once the data is stored within data storage 540A, the pointer to the data block is returned to the storage controller. The storage controller may then access data storage 540A to provide the read data to the requesting host.

It is noted that cache mirroring may be used to build a robust recovery model. For example, if primary cache system 500 fails during an update of its own metadata, either in metadata storage 520A or 530A, both the data and the metadata stored within secondary cache system 550 is still intact. Further, if there is a failure of primary cache system 500 while mirroring the data into secondary cache system 550, since the secondary cache system 550 has not committed the data, the metadata has not been updated even though the data blocks corresponding to the mirroring operation may have been partially or wholly written. The data may be safely ignored due to the metadata not being committed. In this way, the surviving cache always has the ready to use metadata and does not require anything to be reconstructed. If a power failure occurs, a suitable emergency shutdown procedure may utilize the metadata structure stored within metadata storage 530A to flush any committed data to the physical storage. The metadata stored within metadata storage 530A is used because metadata storage 520A is a volatile storage and would most likely have lost any data during a power failure. If both primary cache system 500 and secondary cache system 550 fail simultaneously, the storage system may still recover during a reboot operation. In one implementation, metadata storage 530A is used to flush all previously committed data stored within data storage 540A to the storage devices (e.g., S1–S2) prior to a full system startup.

Figure 6:
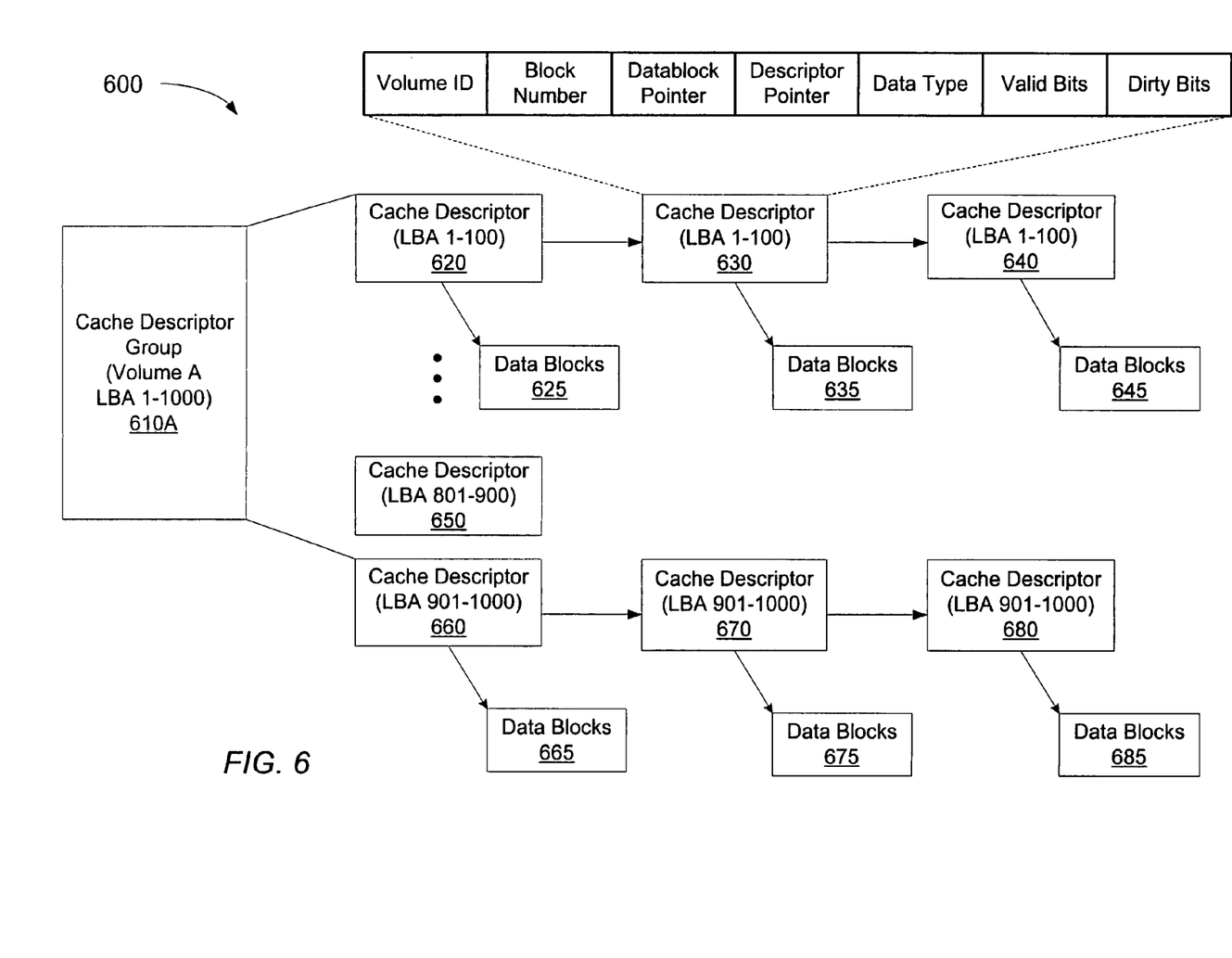
FIG. 6 is a diagram depicting an alternative embodiment of the fully associative metadata structure of the storage cache system of FIG. 2.

Turning to FIG. 6, a diagram depicting an alternative embodiment of the fully associative metadata structure of the storage cache system of FIG. 2 is shown. Metadata structure 600 is a collection of cache descriptors that describes corresponding data blocks stored in data storage 220. The cache descriptors are arranged into a cache descriptor group. The cache descriptor group consists of a number of cache descriptors where each of the cache descriptors points to data blocks residing anywhere in data storage 220. In addition, as will be described further below, cache descriptors pointing to related data blocks may be chained together by pointing to other cache descriptors. It is noted that metadata structure 600 may also be representative of the metadata structure used in metadata storage 520A and 520B of FIG. 5.

A descriptor group may either be fully populated or partially populated with corresponding data blocks containing data. In the illustrated embodiment, cache descriptor group A includes cache descriptors that correspond to data blocks having logical block addresses one through 1000 in volume A. The cache descriptors associated with LBA 1-100 are designated 620, 630, and 640. The cache descriptor associated with LBA 801-900 is designated 650, and the cache descriptors associated with LBA 901-1000 are designated 660, 670, and 680. It is noted that although the cache descriptor group is associated with a contiguous number of logical block addresses, it is contemplated that in other embodiments the cache descriptor group may be associated with other attributes.

As described above, each cache descriptor points to and includes information describing a corresponding data block stored anywhere within data storage 240. For example, cache descriptor 620 points to data block 625, cache descriptor 630 points to data block 635, and so on. In addition, each cache descriptor may point to another cache descriptor that points to a data block that is related to the first data block.

Data blocks may be related in various ways. For example, it may be desirable to store various versions of generational data. In addition, for systems employing data striping such as a RAID level 5 system, for example, it may be desirable to cache the old data, the new data and the parity or "Exclusive OR" (XOR) of the old and new data. Thus, the data blocks storing each version of the generational data are related. Likewise, the data blocks storing the new, old and parity data are also related to one another.

In the illustrated embodiment, the contents of cache descriptor 630 are shown as an exemplary illustration of the contents of any cache descriptor within metadata storage 220. The contents of cache descriptor 630 are similar to the contents of cache descriptor 325A of FIG. 3, although cache descriptor 630 is shown having two additional fields, which are described below. The additional fields are the fourth field from the left and the fifth field from the left. The fourth field is labeled "Descriptor Pointer" and may contain a pointer to another cache descriptor within metadata storage 220. The fifth field from the left is labeled "Data Type." If the fourth field includes a pointer to another cache descriptor, the Data Type field will contain an indication of the type of data (e.g., old, new, XOR). Alternatively, the data type field may be an encoding associated with the age of the related data blocks. It is further noted that other fields having other identifiers may be used such as whether an operation is currently in progress, for example.

Similar to the metadata structure 300 illustrated in FIG. 3, in one implementation, metadata structure 600 may include a valid list of cache descriptors organized based on properties such as least recently used (LRU) data blocks, for example. It is noted that in alternative implementations, metadata structure 600 may also include a separate field (not shown) identifying the LRU status of a given entry relative to each other entry for use by cache control logic 210 when evicting entries and corresponding data blocks.

In some systems, diverse data representation may be particularly useful. For example, some high RAS systems may not allow write-in place writes that would allow new data to overwrite already existing data, particularly if the old data is dirty. Since the cache system may fail in the middle of the write of the new data, it could render both the new and the old data useless.

Referring collectively to FIG. 1-FIG. 2 and FIG. 4-FIG. 6 when a write request is received to write new data and old data exists that is dirty, cache control logic 210 may allocate a new data block within data storage 240 and a new cache descriptor, linking the new descriptor back to the descriptor that points to the old data block. Once the new data block is flushed to the underlying storage volume, the first cache descriptor may be re-pointed to the newly arrived data block. For example, if the old data block is data block 625, cache descriptor 620 would include a pointer to that data block. If a write request is received to the same address contained in cache descriptor 620, cache control logic 210 allocates a new data block (e.g., 635) and allocates another cache descriptor (e.g., 630) to point to the new data block. Once the data in data block 635 is flushed to the storage volume, cache control logic 210 may write the datablock pointer value contained within cache descriptor 630 into cache descriptor 620 and then deallocate data block 625 in the freelist. In addition, since the data blocks are no longer related, the descriptor pointer field of cache descriptor 625 may be cleared or set to some default value.

For systems employing data striping such as a RAID level 5 system, for example, in one implementation, the parity data and the old data and their corresponding metadata may be kept in the non-volatile data storage and non-volatile metadata storage, respectively until the stripe becomes valid in the underlying storage volume. Depending on the implementation, the stripe may become valid when parity data is flushed to the underlying storage volume or when the new data is flushed to the underlying storage volume, or both.

There may be remote data replication (e.g., long distance mirroring) implementations where, due to the distances involved, it may be more advantageous to commit the data to the non-volatile cache memory and to perform all the remote operations in the background asynchronously. In other words, a host that requested that new data be written over existing data may receive a completion acknowledgement as soon as the new data is committed in the cache memory and prior to the completion of the data being mirrored.

For example, in one implementation employing generational data storage and mirroring, when an initial write operation is complete within a primary cache system (e.g., primary cache system 500), primary cache control logic 510A initiates a remote data write operation to a data storage of a secondary cache system (e.g., secondary cache system 550) as described above in conjunction with the description of FIG. 5. When a write request is received by a primary cache system (e.g., primary cache system 500) to write new data over the old data, while the old data is being mirrored, the new data may be readily accepted within primary cache system 500 as described above. In such an implementation, primary cache control 510 may allocate new data blocks within data storage 540A and metadata locations within metadata storages 520A and 530A. Thus, once the new data is committed within the primary cache system 500, the host may be notified that the write operation is complete and the new data may be written to secondary cache system 550 in the background.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A storage system comprising:
   a cache configured to store a plurality of data blocks in a first plurality of locations, wherein said cache is a non-volatile storage;
   a first metadata storage including a plurality of entries configured to store metadata including block addresses of data blocks within said cache, wherein said first metadata storage is a non-volatile storage;
   a second metadata storage including a second plurality of locations each configured to store metadata including a block address identifying a corresponding data block within said cache and further including a first pointer to said corresponding data block within said cache, wherein said second metadata storage is a volatile storage;
   wherein at least one of said second plurality of locations is further configured to store a second pointer to another of said second plurality of locations that stores metadata corresponding to a related data block;
   wherein said metadata stored within the second metadata storage is arranged into one or more cache descriptors each associated with a respective data block; and
   wherein said one or more cache descriptors are arranged into one or more groups, wherein a given group includes one or more cache descriptors that correspond to contiguous logical block addresses of an underlying storage volume.

2. The storage system as recited in claim 1 further comprising cache control logic coupled to said cache and configured to update said first metadata and said second metadata.

3. The storage system as recited in claim 1, wherein each entry of said plurality of entries corresponds to a respective one of said plurality of locations in said cache.

4. The storage system as recited in claim 1, wherein each of said second plurality of locations is configured to store metadata corresponding to any of said plurality of locations in said cache storage.

5. The storage system as recited in claim 1, wherein said metadata includes a value indicative of whether a corresponding data block contains valid data.

6. The storage system as recited in claim 1, wherein said metadata includes a value indicative of whether a corresponding data block has been flushed to an underlying storage volume.

7. The storage system as recited in claim 1, wherein said metadata includes a value corresponding to a volume identifier of an underlying storage volume.

8. The storage system as recited in claim 1, wherein said related data block is new data having a particular block address and said corresponding data block is old data having said particular block address.

9. The storage system as recited in claim 1, wherein said another of said second plurality of locations stores a third pointer to an additional one of said second plurality of locations that stores metadata corresponding to an additional related data block.

10. The storage system as recited in claim 9, wherein said additional related data block is data corresponding to the result of an Exclusive OR operation between said corresponding data block and said related data block.

11. The storage system as recited in claim 1, wherein said metadata stored within said second metadata storage further includes values indicative of the types of data blocks pointed to by said pointers.

12. The storage system as recited in claim 1, wherein said storage system further comprising a storage for storing data including said plurality of data blocks cached within said cache.

13. The storage system as recited in claim 8 further comprising a controller unit coupled between said storage and said cache and configured to control storage of said data within said storage.

14. The storage system as recited in claim 8, wherein said storage includes a storage volume including at least one physical storage device.

15. The storage system as recited in claim 14, wherein said at least one physical storage device includes one or more hard disk drives.

16. A method comprising:
storing a plurality of data blocks in a first plurality of locations of a cache, wherein said cache is a non-volatile storage;
storing within a non-volatile first metadata storage including a plurality of entries, metadata including block addresses of data blocks within said cache;
storing within each of a second plurality of locations of a volatile second metadata storage, metadata including a block address identifying a corresponding data block within said cache and further including a first pointer to said corresponding data block within said cache;
storing within at least one of said second plurality of locations, a second pointer to another of said second plurality of locations that stores metadata corresponding to a related data block;
arranging said metadata stored within said second metadata storage into one or more cache descriptors each associated with a respective data block; and
arranging said one or more cache descriptors into one or more groups, wherein a given group includes one or more cache descriptors that correspond to contiguous logical block addresses of an underlying storage volume.

17. The method as recited in claim 16, wherein each entry of said plurality of entries corresponds to a respective one of said plurality of locations in said cache.

18. The method as recited in claim 16 further comprising storing within each of said second plurality of locations, metadata corresponding to any of said plurality of locations in said cache storage.

19. The method as recited in claim 16, wherein said metadata includes a value indicative of whether a corresponding data block contains valid data.

20. The method as recited in claim 16, wherein said metadata includes a value indicative of whether a corresponding data block has been flushed to an underlying storage volume.

21. The method as recited in claim 16, wherein said metadata includes a value corresponding to a volume identifier of an underlying storage volume.

22. The method as recited in claim 16, wherein said related data block is new data having a particular block address and said corresponding data block is old data having said particular block address.

23. The method as recited in claim 16 further comprising storing within said another location of said second plurality of locations, a third pointer to an additional one of said second plurality of locations that stores metadata corresponding to an additional related data block.

24. The method as recited in claim 23, wherein said additional related data block is data corresponding to the result of an Exclusive OR operation between said corresponding data block and said related data block.

25. The method as recited in claim 16, wherein said metadata stored within said second metadata storage further includes values indicative of the types of data blocks pointed to by said pointers.

* * * * *